May 1, 1934.  C. E. L. LIPMAN  1,956,869
SEALED CONNECTER
Filed Feb. 6, 1931
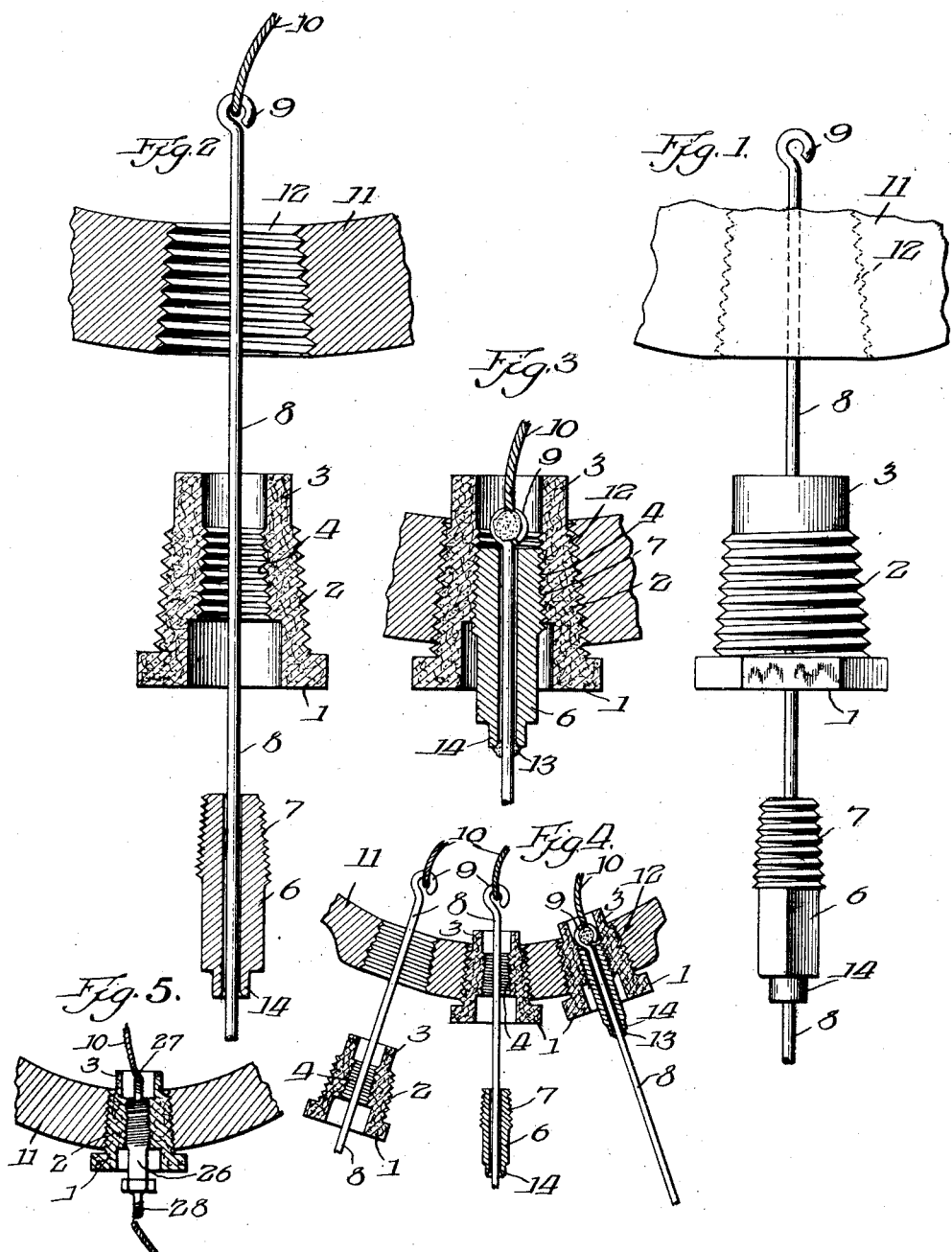
Inventor:
Carl E. L. Lipman
By Wilson, Dowell, McCanna & Dehm
Titus
Witness:
R. B. Davison Patented May 1, 1934

1,956,869

UNITED STATES PATENT OFFICE 1,956,869

SEALED CONNECTER

Carl E. L. Lipman, Chicago, Ill., assignor to Lipman Patents Corporation, Chicago, Ill., a corporation of Delaware Application February 6, 1931, Serial No. 513,960

1 Claim. (Cl. 173—311)

This invention relates to a seal particularly suitable as a sealed connection for an electrical device to permit the passage of an electrical conductor such as a lead-in wire through a hermetically sealed enclosure surrounding the electrical device.

Considerable difficulty has been experienced in the past in providing sealed connections of this type such as lead-in wires for electrical devices wherein the electrical device was enclosed in a sealed container. An illustration of such an instance is a hermetically sealed motor compressor unit of a refrigerating system. In such an application the difficulties are further increased because of the temperature and pressure conditions and because it is usually desired to have a sealed connection or lead-in wire that is removable or at least insertable after the casing and unit has otherwise been closed. It is of course necessary to insulate the lead-in wire and to seal the wire to the insulation and the insulation to the casing in gas-tight relation.

It is the purpose of this invention to provide a connection which is capable of withstanding shocks, vibration and changes in temperature as well as pressure, which will effectively seal an electrical conductor by a high resistance insulating member adapted to be inserted after substantially all other elements have been completed and which is removable or replaceable in the event that a defective seal is discovered and to provide such a seal.

It is a further object of this invention to provide such a seal that is particularly well adapted to extend a motor lead through the sealed casing surrounding a motor compressor unit of a sealed refrigerating system wherein the connection will be subject to high pressures and changes in temperature.

In accordance with this invention a pair of sealing members having coöperative wedging surfaces are provided which, in combination with a suitable aperture formed in the casing through which the conductor is to be passed, cooperate to form a gas-tight seal for an electrical conductor passing through the two members. In the preferred form of this invention although not the only form, an outer insulating member is provided which is formed with an exterior tapered surface adapted to be received in and secured to a correspondingly tapered hole in the casing through which the conductor is to be extended. The outer member is adapted to cooperate with and to receive a correspondingly tapered inner member, the inner member being tapered and secured to the outer member in such a manner as to increase the tightness of the joint between the casing and the outer member. The conductor or extended lead is passed through the two members and is sealed thereto.

A better understanding will be had of this invention from a consideration of the drawing and detailed description given in connection therewith, in which:

Fig. 1 is a side elevation of the elements constituting the seal embodying the principles of this invention arranged in spaced relative positions prior to assembling.

Fig. 2 is a transverse section through the center of the elements shown in Fig. 1.

Fig. 3 is a transverse section through approximately the center of the connection completely assembled and in position.

Fig. 4 is a transverse section through an application embodying three connections in different stages of assembly.

Fig. 5 is a transverse section through a further modified form of this invention.

Referring particularly to that form of this invention illustrated in Figs. 1 to 4 inclusive, it will be seen that the connection comprises an outer sleeve-like or socket member 1 of an impervious insulating material preferably having some inherent resiliency or yieldability, cylindrical in formation and having the major portion of its outer periphery tapered and threaded as at 2 terminating in a projecting annular rim 3 at one end and in a nut for engagement with a wrench at the other end. The material of which the sleeve is composed, while possessing yieldability or resiliency in a broad sense, cannot possess these characteristics to the extent that rubber does which, because of its extreme compressibility and its liability to deterioration when subjected to oil or high temperatures both of which are present in the sealing case of a hermetically sealed refrigerating machine, is quite unsuitable for the purposes of my invention. Yieldability in the sense of ductility or semi-plasticity is contemplated by my invention. Sleeve 1 is bored centrally, the center portion of the bore being tapered and threaded as at 4, the threaded portion of the bore being concentric with the outer threaded portion and lying within the terminating ends thereof.

An inner plug or wedge-like member 6, preferably formed of a conductive material harder than the insulating material of the sleeve, is provided and has a tapered threaded end portion 7 of proper diameter and pitch to fit within the tapered threaded bore 4 of the outer member 1. The opposite end portion of the inner member is squared or otherwise provided with flat surfaces to permit the plug member to be engaged by a wrench. The plug member is also provided with a central bore to receive a conductor or lead wire 8 having upon its inner end an eye 9 for attachment to the lead 10 of the electrical device.

In use the casing 11 for sealing the electrical device is prepared with a tapered opening therethrough threaded as at 12 to receive and engage the tapered threaded portion 2 of the outer member 1. The eye 9 of the conductor 8 is secured to the lead 10 and is passed through the threaded opening 12 of the casing. The outer member 1 is then slid over the conductor 8 and screwed tightly into the threaded opening 12, the plug 6 is then inserted over conductor 8 and screwed tightly into the inner threaded bore of the outer member. The screwing of the plug 6 into the sleeve 1 acts as a wedge and tends to spread sleeve 1 outwardly against the casing to tightly seal the same against both the inner plug which is relatively harder than the outer sleeve and also against the threaded aperture through the casing 11 thus making a gas-tight seal between plug 6, shell 1 and casing 11. The conductor 8 is then pulled outwardly to bring eye 9 within the rim 3 which serves as an insulating enclosure for the eye after which the conductor 8 is sealed as by soldering at 13 to the projecting end 14 of the plug 6.

In the modification shown in Fig. 5 the connection is substantially like that shown in Figs. 1 to 4 inclusive modified to a certain extent, that is, the wedge or expanding member 26 is a solid electrically conductive member to which the motor lead 10 and extended lead are directly soldered or otherwise secured. For this purpose the inner end of the wedge member is provided with a reduced tip 27 to which the motor lead 10 may be secured and the outer end is provided with a reduced tip 28 to which the continuing wiring may be soldered.

From the foregoing description it will be apparent that there has been provided a connection suitable for many purposes and embodying generally two wedge members and means for drawing the same together in such a manner as to tightly seal each against the other and against the wall of the opening through the supporting casing. In the specific embodiment illustrated in Figs. 1 to 4 inclusive the tapered threads formed upon the tapered walls form a plurality of associated cooperating wedged surfaces which when jammed together form a perfect impervious seal therebetween. When the conductor is sealed to the inner member the complete connection is absolutely gas-tight and is particularly well adapted to withstand high pressures and varying temperatures without breaking down.

It is also apparent from the description that the construction permits of the insertion of the connection as the last element in assembling the machine and also provides for removal and replacement should any defect occur or should it be desired to get into the casing for any reason whatever.

It is obvious that minor changes may be made in the details of construction without departing from the spirit and scope of this invention as defined in the claim appended hereto.

I claim:

The combination with a casing provided with an inwardly tapered and tapped lead in opening, of an insulating sleeve formed of high temperature and pressure resisting material capable of being deformed by mechanical action, said sleeve being exteriorly tapered and threadedly engaged in said opening, the bore of said sleeve being tapered and tapped, and a non-deformable tapered, exteriorly threaded plug threaded into said bore with sufficient force to expand said sleeve into hermetic sealing relation with the surrounding walls of said opening, and an electrical lead wire connected to said plug.

CARL E. L. LIPMAN.